Patented Jan. 19, 1926.

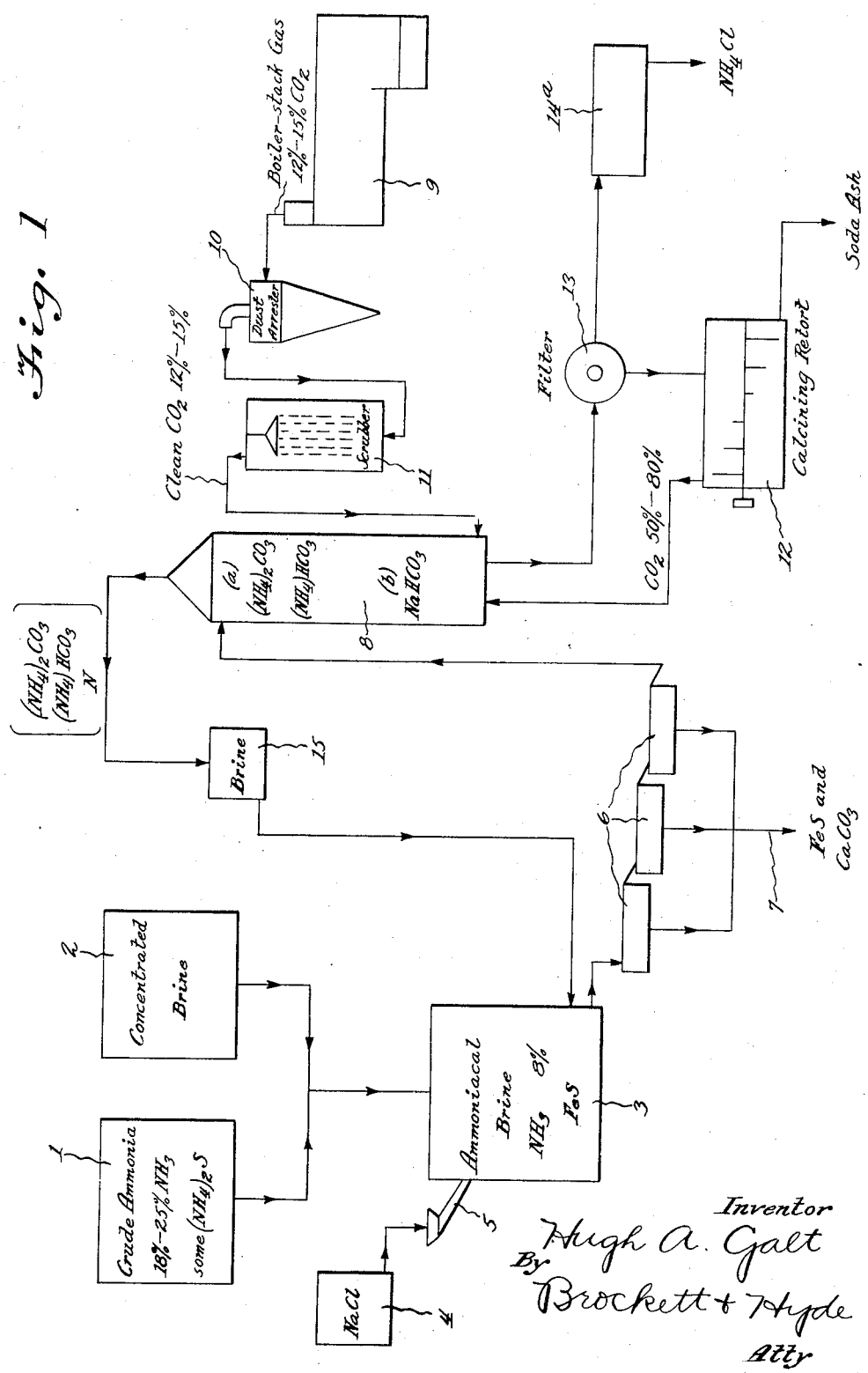

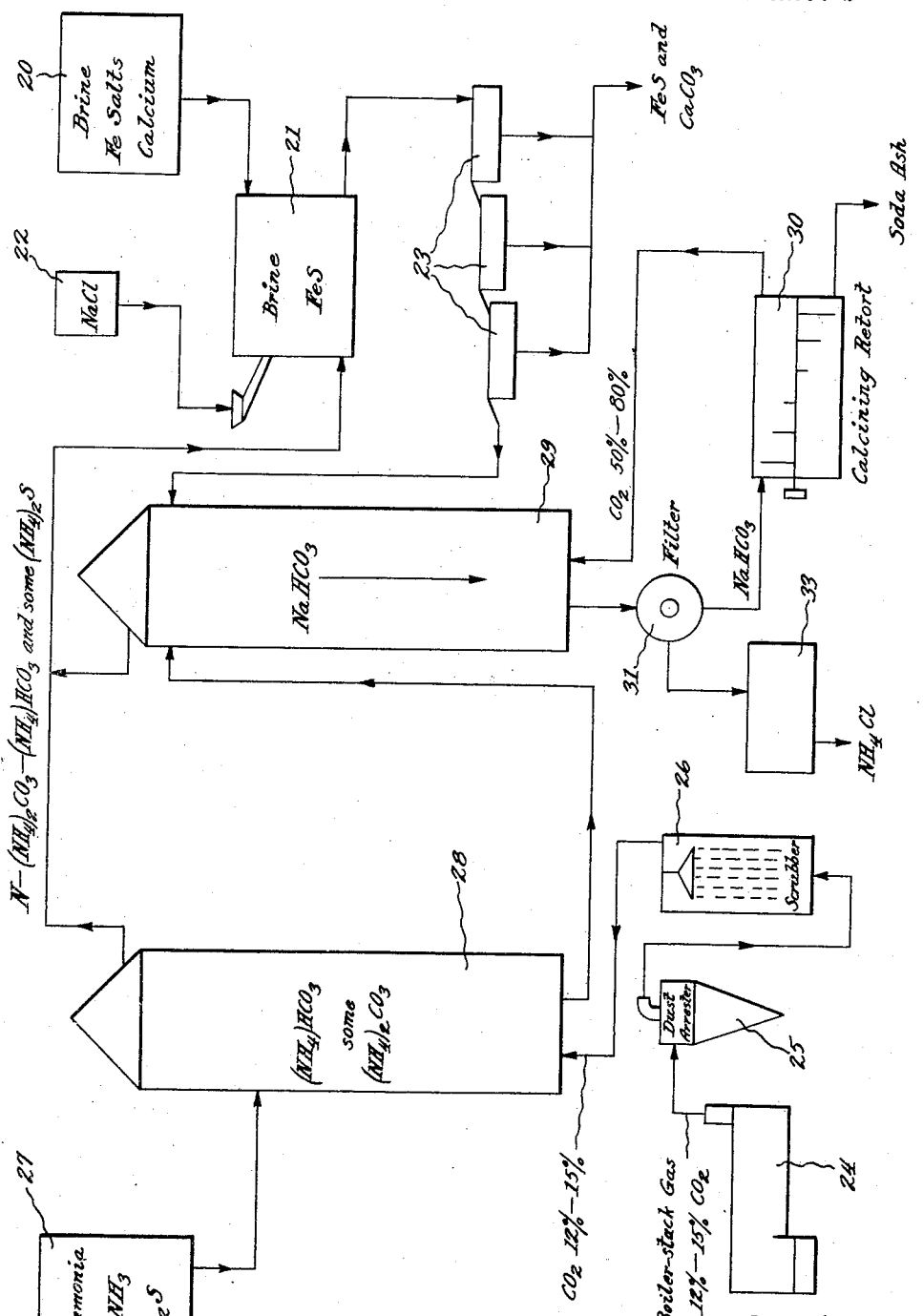

1,570,299

UNITED STATES PATENT OFFICE.

HUGH A. GALT, OF AKRON, OHIO, ASSIGNOR TO THE PITTSBURGH PLATE GLASS COMPANY, OF PITTSBURGH, PENNSYLVANIA, A CORPORATION OF PENNSYLVANIA.

AMMONIA SODA PROCESS.

Application filed May 1, 1922. Serial No. 557,801.

*To all whom it may concern:*

Be it known that I, HUGH A. GALT, a citizen of the United States, residing at Akron, in the county of Summit and State of Ohio, have invented certain new and useful Improvements in Ammonia Soda Processes, of which the following is a specification.

This invention relates to an ammonia-soda process, its object being to largely reduce the cost of production by the utilization of new and cheaper sources of raw material, the recovery of ammonium chloride as a final instead of as an intermediate product and the avoidance of any necessity of using limestone or coke either for carbonic acid gas or for ammonia distillation.

A further object of the invention is to provide an ammonia-soda process which automatically or without special attention by the operator takes care of separation of iron salts from the ammoniated brine solution and thereby insures white soda ash. A further object of the invention is to enable the ammonia-soda process to be practised with low test or low percentage carbonic acid gases, thereby enabling boiler stack or other otherwise waste gases containing relatively low amounts of carbonic acid gas to be employed.

Further objects of the invention will appear more fully from the detailed description of the method hereafter.

In the drawings, Fig. 1 is a diagrammatic view illustrating one method embodying the invention; and Fig. 2 is a similar view illustrating another method.

In the ammonia-soda process as ordinarily practised the ammonia is used over and over again by recovering the ammonia gas from the ammonium chloride, it being necessary to only supply sufficient ammonia to take care of unavoidable losses. While some attempts have been made to practise the process with a continuous supply of fresh ammonia, such as synthetic ammonia, such processes have been impractical for lack of a proper source of carbonic acid gas, mainly for the reason that it has been considered necessary to supply the carbonic acid gas in relatively concentrated form, such as in a gas containing approximately 35 to 50 per cent of $CO_2$.

According to my invention a low test gas relatively weak in carbonic acid gas may be employed, such for example as the otherwise waste gases produced by boilers or other apparatus where fuel is burned for the production of heat. Such waste gases contain approximately 12 per cent of $CO_2$ when the fuel is coal, but if desired coke can be employed as fuel to produce a purer $CO_2$ at a concentration of about 15 per cent.

The method is practised in such manner as to enable ammonium chloride to be ultimately recovered as a useful product for fertilizer or other uses. By this method the ammonia is therefore combined with the chlorine of the sodium chloride to fix it as chloride of ammonia, instead of fixing ammonia as sulfate by the use of sulfuric acid, which is the common practice in the manufacture of fertilizer. Therefore by this method the chlorine in the sodium chloride takes the place of expensive sulfuric acid. As a cheap source for ammonia, which must be continuously supplied for fixation as ammonium chloride, I prefer to use ordinary crude ammonia, although synthetic ammonia might be employed if it contained ammonium sulfide or if sulfide is added thereto. The crude ammonia is that produced as a by-product in the operation of coke ovens or like plants. It contains from 18 to 25 per cent of $NH_3$, more or less, and in addition is always found to contain ammonium sulfide and some ammonium carbonate. Possible other impurities are unimportant. The ammonium sulfide always found in this crude ammonia is important in the present process, as will appear. The carbonate ultimately becomes sodium bicarbonate.

According to one process embodying the invention, as illustrated diagrammatically in Fig. 1, crude ammonia indicated at 1, is diluted with concentrated brine indicated at 2 in a suitable tank or vessel 3, which may be similar to the ammonia absorbers commonly employed in the ammonia-soda process. The brine is produced from any suitable source of salt but should be a completely saturated solution of sodium chloride. Said brine may be purified in any suitable manner to remove calcium or magnesium salts. Moreover, all ammoniated brines of this character after passing through this apparatus, inevitably contain a small quantity of iron salts, which if not removed stain the final bicarbonate or soda ash so deeply as to render them unsaleable. In the present method these iron salts are separated without special attention, as will appear. The dilution of the ammonia with the brine is proportioned to reduce the ammonia content to about 8 per cent $NH_3$, which is the same percentage as in the ammoniacal brine in the ordinary ammonia-soda process. Full and complete concentration or saturation of the brine may be insured by adding a small quantity of solid salt (sodium chloride) such as salt or salt slurry 4 admitted to the vessel 3 at 5. In said vessel the ammonium sulfide from the crude ammonia reacts with the iron salts from the brine, precipitating an iron sulfide.

The liquor from the vessel 3 is now conducted to suitable settling tanks 6 of any suitable form where solid materials, including lime salts, iron sulfides and possible other impurities settle out and are removed at 7. The liquor is next conducted to one or more carbonating towers 8, which may be of any suitable form, such for example as the carbonating towers usually employed in the ammonia-soda process. In said towers the ammoniacal brine is first carbonated with carbonic acid gas of low test or value. This gas may be produced at the boilers 9 where fuel is burned to produce steam for power or for other purposes, or any furnace where coal or coke is being burned for fuel. The boiler stack gas, containing from 12 to 15 per cent $CO_2$ is cleaned in any suitable manner, such as by passing it through cyclone or other dust arresters 10 to remove solids and through scrubbers 11 where the gas passes through a water spray to remove soot or other finer particles which pass through the dust arresters. If the water spray absorbs too much $CO_2$ some other reagent than water might be employed although in the average ammonia-soda plant the otherwise waste boiler stack gases are so large in quantity that loss of $CO_2$, in the scrubbers is immaterial. The clean gas is conducted to the carbonating towers 8 and forced to flow through the liquor column therein for a suitable period of time determined by volumetric or other tests of the liquor. This low test $CO_2$ gas does not produce precipitation or crystallization of sodium bicarbonate, but combines with the ammonia, forming mostly ammonium carbonate with the production of some ammonium bicarbonate, and possibly a small quantity of sodium bicarbonate. When formation of the ammonium carbonate is practically complete the relatively high test gas produced from calcination of the bicarbonate, as is usual in ammonia-soda processes, and which high test gas contains about 50 to 80 per cent $CO_2$, is forced to the carbonating tower from the calcining retorts 12. The admission of this high test $CO_2$ gas produces at this step of the process in the carbonating towers essentially the critical conditions which ordinarily have been found necessary to avoid a slime and precipitate or crystallize sodium bicarbonate in proper form for efficient filtration. In other words, when this high test $CO_2$ is passed into the carbonating tower the pressure and temperature conditions, as well as the degrees of concentration of brine, $CO_2$ and ammonia are practically identical with the like conditions in the carbonating towers of the ordinary ammonia-soda process. As a result sodium bicarbonate is thrown down in the liquor which is conducted to suitable filters, such as the rotary filters 13, where the bicarbonate is separated and conducted to the calcining retorts 12 for conversion into soda ash as indicated at 14. The ammonium chloride in the mother liquor is not redistilled with lime for recovery of ammonia, but the ammonium chloride is suitably recovered therefrom at 14ª for commercial use either as a fertilizer or for other purposes. Any suitable method may be employed for recovery of ammonium chloride, such as evaporation, or fractional crystallization, although probably the ammonium chloride will be more readily recovered by crystallization in the presence of an excess of salt.

The gases emitted from the carbonating towers contain large quantities of nitrogen, some ammonia and some ammonium carbonate and bicarbonate. These gases may be passed through a small quantity of brine in a suitable absorber 15 and the liquor in which the ammonia and carbonate and bicarbonate are absorbed may be conducted back to the vessel 3 to be again passed through the system, thereby recovering otherwise waste ammonia and precipitating lime salts.

In the method described it is unnecessary to concentrate the $CO_2$ so that otherwise waste gases low in value as regards the $CO_2$ may be directly employed. Also, the method can be continuously practiced with crude ammonia, large quantities of which can be secured in the open market, with the recovery as a useful product of the ammonium chloride which is ordinarily the source of ammonia. At the same time the employment of crude ammonia automatically and without any special attention takes care of the separation of iron and avoids staining the ultimate products.

Fig. 2 diagrammatically illustrates another method embodying the invention. Here a suitable brine from any source and necessarily containing iron and calcium salts is conducted from the vessel 20 to an absorbing tank 21 where the concentration of the brine may be insured by the addition of sodium chloride from a source 22 as before. The brine, of course, is purified, as before, to remove calcium and magnesium salts and other impurities where necessary and is passed through the settlers 23 for removal of solid impurities. The boiler stack gas from the boilers 24 is passed through dust arresters 25 and scrubbers 26 and brought directly into contact with the crude ammonia supplied from the source 27. Contact may be effected in any suitable manner, such as in a suitable absorbing tower 28 which may be of the same character as the carbonating towers of the ammonia-soda process. In these towers the clean boiler stack gas, containing 12 to 15 per cent $CO_2$, passes through the crude ammonia containing 18 to 25 per cent $NH_3$, some ammonium sulfide and some ammonium carbonate. The gas emitted from said towers contains a large quantity of nitrogen, ammonium bicarbonate and carbonate and some ammonium sulfide. Clean boiler stack gas is passed through the towers 28 until, as determined by volumetric or other tests of the liquor, the ammonia therein is substantially all converted into ammonium carbonate and bicarbonate.

Next, contact is effected between the carbonated ammonia in towers 28 and the purified brine coming from the settling tanks 23. This contact may be effected in any suitable manner and probably is best effected in carbonating towers 29 similar to those now employed in the ammonia-soda process. Simultaneously with the production of said contact high test $CO_2$ gas produced from calcination of the bicarbonate in the calcining retorts 30, said gas containing about 50 to 80 per cent $CO_2$, is pumped into the towers 29. The effect is to produce in the towers 29 conditions identical with those in the carbonating towers in the ammonia-soda process. In other words, pressure, temperature, concentration or excess of high test $CO_2$ and concentration of ammonia and brine are identical with those in the ammonia-soda process. These critical conditions precipitate or crystallize sodium bicarbonate which is conducted to the filters 31 for separation of sodium bicarbonate and conduction of the same to the calcining retorts 30 from which soda ash is recovered at 32 and conduction of the mother liquor to suitable devices indicated at 33 where the ammonium chloride is recovered as a useful product, as before.

The gas emitted from the towers 29 contains nitrogen, carbonate and bicarbonate and some sulfide. It is combined with the gas coming from the towers 28 and both gases are passed into the absorber 21 where contact is effected with the concentrated brine. In this absorber the ammonium sulfide combines with the iron salts, so that sulfides of iron and calcium carbonate are separated in the settlers 23, as in the method before described.

In putting into operation such an ammonia-soda process as before described it may be necessary with an entirely new plant to at first supply some concentrated or high test $CO_2$ to produce the critical conditions necessary for precipitation of the properly crystallized sodium bicarbonate. However, in most cases the process is put into effect by gradual conversion of an ordinary ammonia-soda plant where the ammonium chloride is distilled for recovery of ammonia. When my new process is set into operation the concentrated or high test $CO_2$ is automatically supplied by the calcination of the bicarbonate. Indeed, it may well be said that in this process the bicarbonate becomes a carrier for high test $CO_2$ for the reason that after the process is started the bicarbonate furnishes high test $CO_2$ and nevertheless all $CO_2$ which ultimately enters into the composition of the soda ash is that which has originally come in the form of low value $CO_2$ from boiler stack gas.

The method has many advantages which flow from the entire omission of lime, either as a source of $CO_2$ or for distillation of ammonia. This does away with the apparatus for burning lime and also does away with the necessity for large quantities of cooling water or ammonia distilling apparatus. Again, no waste lime as calcium chloride is produced and it is unnecessary to provide waste lakes to take care of these waste products. The method also produces much saving in labor and materials.

What I claim is:

1. An ammonia soda process, consisting in bringing into contact with each other crude ammonia, concentrated brine, and a low test carbonic acid gas to thereby carbonate the ammonia without material precipitation of sodium bicarbonate, passing high test carbonic acid gas into the mixture and thereby precipitating sodium bicarbonate, and calcining the bicarbonate to form soda ash and supply said high test carbonic acid gas, thereby in effect concentrating the low test carbonic acid gas.

2. An ammonia soda process, consisting in carbonating crude ammonia with a low test carbonic acid gas to form ammonium bicarbonate and carbonate, mixing the carbonated ammonia thus formed with a concentrated brine solution, passing high test carbonic acid gas into the mixture to precipitate sodium bicarbonate, and calcining the bicarbonate to form soda ash and supply said high test carbonic acid gas, thereby in effect concentrating the low test carbonic acid gas.

3. An ammonia soda process, consisting in absorbing low test carbonic acid gas in ammonia and by re-action with a brine solution forming ammonium bicarbonate, calcining the sodium bicarbonate ultimately formed to thereby produce soda ash and high test carbonic acid gas, and passing the high test gas into the ammoniated brine to produce the critical condition for proper formation of and thereby form sodium bicarbonate, thereby in effect utilizing the sodium bicarbonate as a carrier to concentrate low test carbonic acid gas to become a permanent constituent of the final soda ash.

In testimony whereof I hereby affix my signature.

HUGH A. GALT.